United States Patent [19]

Dennerlein et al.

[11] Patent Number: 4,868,459
[45] Date of Patent: Sep. 19, 1989

[54] METHOD OF AND CIRCUIT FOR BRIGHTNESS AND TEMPERATURE-DEPENDENT CONTROL OF AN LCD ILLUMINATOR

[75] Inventors: Ludwig Dennerlein, Eckental/Eckenhaid; Eckhard Walters, Röthenbach/Pegnitz, both of Fed. Rep. of Germany

[73] Assignee: U.S. Philips Corporation, New York, N.Y.

[21] Appl. No.: 83,546

[22] Filed: Aug. 6, 1987

[30] Foreign Application Priority Data

Aug. 9, 1986 [DE] Fed. Rep. of Germany ....... 3627134

[51] Int. Cl.$^4$ ..................... H05B 39/04; H05B 39/09; G09G 3/00
[52] U.S. Cl. .................................. 315/158; 315/308; 315/309; 315/77; 350/345
[58] Field of Search ................. 315/151, 158, 307, 77, 315/82, 118, 134, 308, 309; 350/131, 338, 345; 340/719, 713, 815.17

[56] References Cited

U.S. PATENT DOCUMENTS

| | | | |
|---|---|---|---|
| 3,483,424 | 12/1969 | Woodnutt | 315/118 |
| 3,539,861 | 11/1970 | Blackford | 315/118 |
| 3,712,047 | 1/1973 | Girard | 350/345 |
| 3,745,403 | 5/1988 | Tamura | 340/713 |
| 4,135,116 | 1/1979 | Smith | 315/151 |
| 4,233,545 | 11/1980 | Webster et al. | 250/214 AL |
| 4,289,383 | 9/1981 | Schwarzschild | 350/345 X |
| 4,319,237 | 3/1982 | Matsuo et al. | 350/333 X |
| 4,368,406 | 1/1983 | Kruzich et al. | 315/77 |
| 4,388,558 | 6/1983 | Mizuno et al. | 315/82 |
| 4,464,606 | 8/1984 | Kane | 315/158 |
| 4,645,974 | 2/1987 | Asai | 315/77 |
| 4,675,777 | 6/1987 | Watrous | 361/106 |
| 4,752,771 | 6/1988 | Katogi et al. | 340/815.17 X |
| 4,760,389 | 7/1988 | Aoki et al. | 350/345 X |

FOREIGN PATENT DOCUMENTS 2310219 1/1984 Fed. Rep. of Germany .
3029122 5/1984 Fed. Rep. of Germany .

*Primary Examiner*—James J. Groody
*Assistant Examiner*—Mark R. Powell
*Attorney, Agent, or Firm*—Bernard Franzblau

[57] ABSTRACT

In order to provide brightness-dependent control of a lamp which is used for illuminating a LCD display, it is known to switch the lamp on and off in dependence on the measured brightness of the incident ambient light. To prevent overheating of the liquid crystal display when it is, for example, exposed to direct sunlight, the operating voltage for the lamp is changed in dependence on the measured brightness of the incident ambient light. A further improvement is accomplished when, additionally, in dependence on the ambient temperature measured, the operating voltage for the lamp changes, more specifically the operating voltage is switched off when a presettable threshold value is exceeded. The circuit arrangement for performing the method requires very little design effort and cost and is integrable to a very large degree.

19 Claims, 1 Drawing Sheet

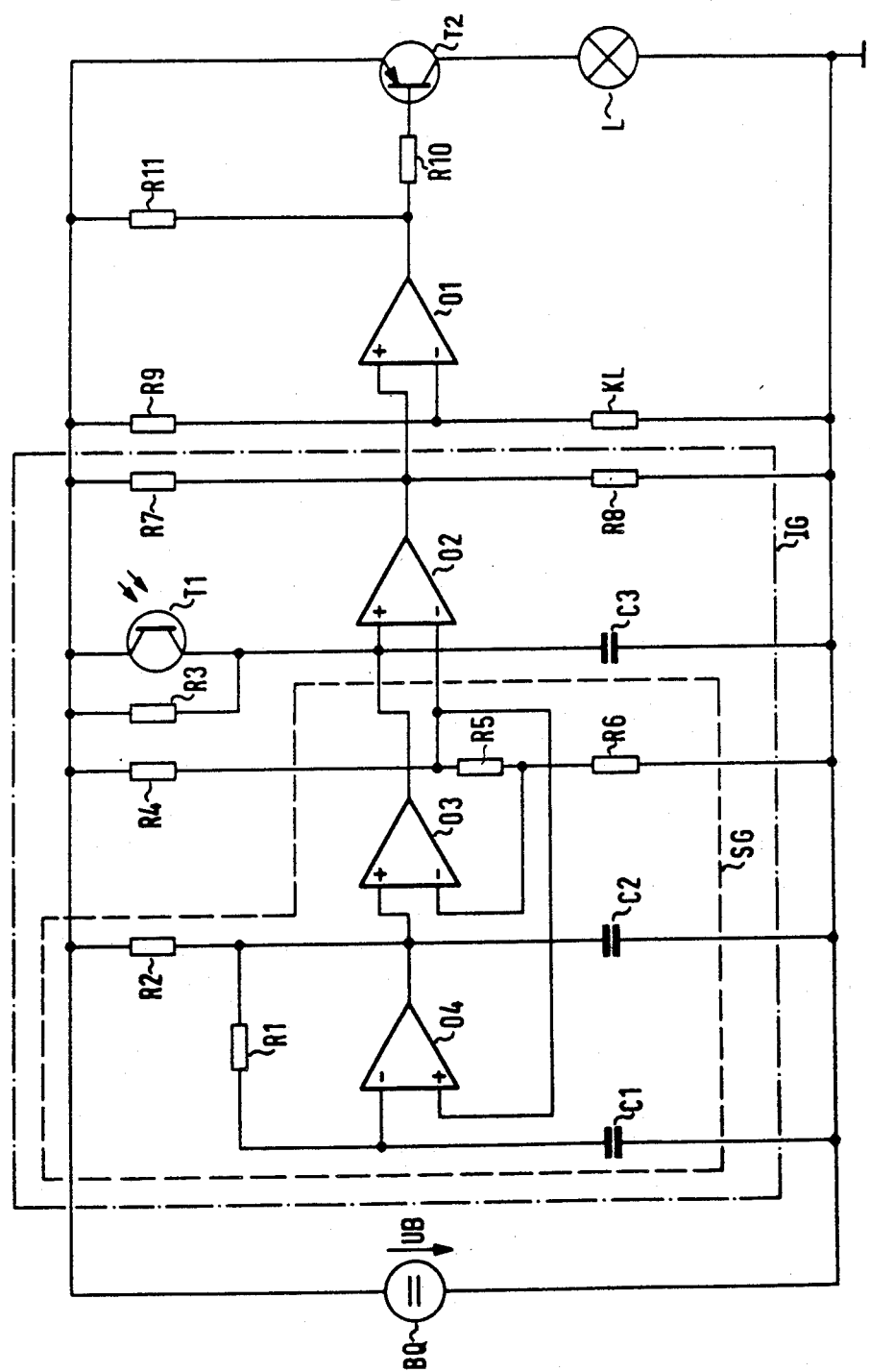

METHOD OF AND CIRCUIT FOR BRIGHTNESS AND TEMPERATURE-DEPENDENT CONTROL OF AN LCD ILLUMINATOR

BACKGROUND OF THE INVENTION

This invention relates to a method of brightness-dependent control of a lamp used, more specifically, for illuminating an LCD (Liquid crystal display). LCD's are preferably used in quartz clocks and pocket calculators. As liquid crystal displays allow of a substantially powerless operation and consequently require only a very low power supply, they are also increasingly used in devices used in the field of communication.

Liquid crystal displays are passive displays, that is to say they control the light incident on them. Liquid crystal displays are provided between front and rear polarizers with a layer of "twisted nematic liquid crystals". Ignoring heat fluctuations, the longitudinal axes of the elongate molecules are parallel to each other in the nematic phase. In response to an electric field applied to the electric crystal display, the originally opaque liquid crystal layer becomes transparent.

If no external electric field is applied, then the direction of the axis of each molecular layer is rotated through a small angle with respect to the adjacent molecular layer. If, for example, the light (daylight illumination or light from a lamp) enters from the rear with a horizontal polarization, then this light is vertically polarized on leaving the liquid crystal layer. If the polarizer arranged at the front of the LCD also has a vertical orientation, then the light travels unimpeded through this polarizer and, for the observer, the picture area makes the impression of being bright.

Liquid crystal displays can be divided into reflective displays, that is to say light incident from the front is reflected or absorbed depending on the switching state of the picture elements, a transmissive display, that is to say light entering from the rear is controlled in correspondence with the information to be displayed and a transflective display which has a semipermanent reflector possessing the properties of the transmissive and the reflective displays. In the negative contrast display mode the information is displayed in bright characters on a dark background, whereas in the positive contrast display mode the representation of the information is effected by dark characters on a bright background.

In liquid crystal displays the liquid crystal layer is sandwiched between front and rear glass plates and a seal is applied along the edges between the glass plates. Transparent electrodes are provided on the glass plates so that when a voltage is applied to the two electrodes, the liquid crystal layer is exposed to an electric field. This electric field causes all the molecule layers to be aligned with the electric field, as a result of which the twist in the electric crystal layer and consequently the rotation of the direction of polarization of the incident light disappears. If light of a horizontal polarization enters from the rear, this light passes with a horizontal polarization at the front so that a vertically oriented polarizer thereat prevents the light from passing it. The picture area strikes the observer as being dark.

For the display of characters, graphs and images, a matrix display is often used. Such a matrix display has horizontal and vertical picture elements which are always arranged in parallel with each other. To display a set of specific characters, for example numbers, a segmented display, for example a seven-segent display is often used. For a direct drive during addressing or selection, respectively, of the picture elements and their brightness control circuit. If each segment or each picture element (pixel) is directly driven, a large number of driver circuits and feeder lines are required therefor. A liquid crystal display for, for example, a five-digit number each having seven segments requires 35 control conductors and a common return conductor, when each segment is to be individually driven. A.c. voltages having a frequency exceeding 30 Hz are used to drive the liquid crystal display in order to obtain a flicker-free image.

To reduce the number of feeder lines and drive circuits, liquid crystal displays are controlled in the multiplex mode, that is to say that, for example, each column or line is activated time-sequentially. The voltage amplitude difference between the voltage across energized and non-energized segments (or picture elements) decreases for an increasing multiplex ratio, the threshold voltages of energized and non-energized picture elements not being distinct and, in addition, varying as a function of temperature. For high multiplex ratios a correspondingly steep control characteristic is consequently required, a pulse amplitude modulation often being used for brightness control of the picture elements, that is to say the amplitude of the drive pulses determines the permeability to light and consequently the brightness of the picture element.

As the switching mechanism in the liquid crystal layer is based on a thermal effect, the heat generation in the liquid crystal display must be kept within limits. Due to incident sunlight, ambient illumination levels up to $10^5$ lux may occur so that the liquid crystal display is difficult to read.

To improve the readability it is known, for a liquid crystal display with positive contrast display, to place a light source at the front face of the liquid crystal display (DE-PS 23 10 219).

In addition, DE-PS 30 29 122 discloses a liquid crystal display arrangement for a motor vehicle. The transmissive display is provided at its rear side with a luminescent body, which for the optional introduction of the ambient light or the light of a light source into the liquid crystal layer is of a movable structure.

In the daylight mode the light source is in the switched-off state and the daylight is concentrated by means of a lens and illuminates the luminescent body. The luminescent body has a reflecting coating at its rear side, through which the incident daylight illuminates the liquid crystal layer from behind.

In the night mode the luminescent body is located at the rear of the liquid crystal display device and the light source is switched on. The light from the light source, reflected from the reflecting coating of the luminescent body is now used to illuminate the liquid crystal display device.

Switching on the light source and simultaneous motor-driven readjustment of the luminescent body to the night mode is effected by means of a switch which is operable on switch-on or switch-off of the lights of the motor vehicle. To prevent manual operation of a switch it is possible to use an electric switch which, in dependence on the brightness (a brightness measured, for example, by means of a cadmium sulphide photo sensor) of the incident ambient light switches on the light source and the motor for readjustment of the luminescent body. It is indeed true that then over-heating of the liquid crystal display device by heat radiation from the light source is prevented, but on the other hand the readjustment of the luminescent body requires a higher design effort and cost.

SUMMARY OF THE INVENTION

An object of the invention is to provide a method of brightness-dependent control of a lamp in such a manner that overheating of the liquid crystal display is prevented to a significant extent.

This object is accomplished by means of a method by a change in the operating voltage for the lamp in dependence upon the measured brightness of the incident ambient light.

The method according to the invention has the advantage that changing the operating voltage in dependence on the measured brightness of the incident ambient light ensures on the one hand a good readability of the liquid crystal display also with incident sunlight, and on the other hand overheating of the liquid crystal display because of the heat generation by the lamp is significantly prevented.

The invention also contemplates a method in which the operating voltage for the lamp is changed in dependence on the measured ambient temperature. This method has the advantage that the liquid crystal display can be optimally illuminated at any ambient light intensity until, for example, because of continuous irradiation by sunlight a critical temperature (limit temperature approximately 90° C.) is reached. Experiments have proven that the diffusor screen for the background illumination (for a liquid crystal display with a positive contrast display) acts as a reflector in the event of direct insolation, so that also when the lamp is switched off an appropriate readability is obtained.

Advantageous embodiments of the method according to the invention are described below and in the claims.

A circuit arrangement for performing the method requires a low circuit cost and design effort and can be integrated to a great extent.

Further advantageous embodiments of the circuit arrangement are set out below and in the claims.

BRIEF DESCRIPTION OF THE DRAWING

The invention and how it can be carried into effect will be described in greater detail hereinafter with reference to an embodiment shown in the accompanying drawing. In the circuit arrangement shown in the FIGURE, the pulse width modulation method is used and the operating voltage UB for a lamp L is varied automatically (i.e. without manual intervention) in dependence on the measured brightness of the incident ambient light and in dependence on the measured ambient temperature. The circuit arrangement has series-arranged comparators, operational amplifiers 01 to 04 being designed so that they can be used as comparators.

DESCRIPTION OF THE PREFERRED EMBODIMENT

A pulse generator IG includes a sawtooth generator SG which is comprised of the fourth operational amplifier 04 having two RC networks R1, C1; R2, C2, a third operational amplifier 03 arranged subsequent to this operational amplifier 04 and a voltage divider R5, R6 connected to one of its inputs.

The resistor R2 has one lead connected to a positive terminal of the operating voltage source BQ and has its second lead connected to both the output of the fourth operational amplifier 04, to a lead of the second capacitor C2, to a first lead of the first resistor R1 and to the non-inverting input of the third operational amplifier 03. The second terminal of the capacitor C2 is connected to ground. Both the inverting input of the fourth operational amplifier 04 and the first terminal of the first capacitor C1, whose second terminal is connected to ground, are connected to the second terminal of the first resistor R1. A voltage divider comprised of a fourth resistor R4 and the fifth and sixth resistors R5, R6 is connected between the terminals of the operating voltage source BQ. The inverting input of the second operational amplifier 02 and the non-inverting input of the fourth operational amplifier 04 are connected to the first tap of the voltage divider. The inverting input of the third operational amplifier 03 is connected to the second tap of the voltage divider.

A third voltage divider, formed by a third capacitor C3 and a phototransistor T1, is connected to the operating voltage source BQ. A third resistor R3 is arranged in parallel with the main current path of the photo-transistor T1. The non-inverting input of the second operational amplifier 02 and the output of the third operational amplifier 03 are connected to the tap of the third voltage divider.

A fourth voltage divider, comprised of a seventh and an eighth resistor R7, R8 and a fifth voltage divider, comprised of a ninth resistor R9 and a PTC resistor KL, are connected to the operating voltage source BQ. The tap of the fourth voltage divider is connected to both the output of the second operational amplifier 02 and to the non-inverting input of the first operational amplifier. The tap of the fifth voltage divider is connected to the inverting input of the first operational amplifier 01.

A first terminal of an eleventh resistor R11 and a first terminal of a tenth resistor R10 are connected to the output of the first operational amplifier 01. The second terminal of the eleventh resistor R11 is connected to a terminal of the operating voltage source BQ. The base of a switching transistor T2 is connected to the second terminal of the tenth resistor R10. The emitter of the switching transistor T2 is connected to a terminal of the operating voltage source BQ and the collector of the switching transistor T2 is connected to a terminal of the lamp L. The second terminal of the lamp L is connected to a terminal of the operating voltage source BQ.

The mode of operation of the circuit arrangement shown in the FIGURE will now be described in greater detail.

The sawtooth generator SG includes the fourth operational amplifier 04 with open collector output. The first capacitor C1 and the second capacitor C2 are charged substantially simultaneously via the second resistor R2 until the differential voltage between the inverting and the non-inverting input of the fourth operational amplifier 04 becomes negative. The output transistor of the fourth operational amplifier 04 is then switched-through and the second capacitor C2 is discharged in a short period of time. The output transistor of the fourth operational amplifier 04 remains conductive until the first capacitor C1 has discharged via the first resistor R1 and the output transistor to such an extent that the differential voltage between the inverting and the non-inverting inputs of the fourth operational amplifier 04 becomes positive again.

The sawtooth voltage drop across the second capacitor C2 has a relatively flat ramp-like leading edge (in the ideal case linear versus time) and a steeper trailing edge (in the ideal case an abrupt drop) This sawtooth voltage produces in the third operational amplifier 03 a short conducting period and a long non-conductive period of the output transistor. The third capacitor C3 connected to the collector of this output transistor is rapidly discharged and is then charged during the non-conducting period of the output transistor via the main current path of the photo-transistor T1. The current flow through the photo-transistor T1 has an amplitude which increases for an increasing luminescent intensity, so that the third capacitor C3 is charged to a greater extent. By means of the third resistor R3, which is arranged in parallel with the main current path of the photo-transistor T1, the lamp L is prevented from going out completely in the case of complete darkness.

By means of the second operational amplifier 02 a rectangular pulse-shaped signal having a light-dependent pulse length and an amplitude equal to half the operating voltage UB is produced from the sawtooth voltage drop across the third capacitor C3.

The resistance value of the ninth resistor R9 is chosen such that, at the inverting input of the first operational amplifier 01, a d.c. voltage exceeding the d.c. voltage of a decreasing value at the non-inverting input of the first operational amplifier 01 is produced below the critical temperature. As a result thereof, the differential voltage between the non-inverting and the inverting inputs of the first operational amplifier 01 is inverted and the output transistor of the first operational amplifier 01 is periodically non-conductive and conductive such that the switching transistor T2 is always non-conductive for a long period of time and conductive for a short period of time in the case of darkness, and the other way round to a corresponding extent when it is bright.

The PTC resistor KL, which is operated in the steep region of the R/$\theta$-characteristic, becomes highly resistive when it is heated to a temperature of, for example, 90° C. Because of the resultant increased voltage drop at the inverting input of the first operational amplifier 01, the voltage difference between the inverting and the non-inverting inputs of the first operational amplifier 01 will not reverse anymore and the switching transistor T2 remains in the non-conductive state, and consequently the lamp L remains dark, until the temperature has decreased again.

The PTC resistor KL must in this situation be provided in a manner such that no self-heating and/or varistor effect can occur. By using suitable materials with a particularly high resistance-temperature variation, it is possible to obtain a very high control accuracy and a fast response of the PTC resistor KL for a PTC resistor KL of small dimensions.

What is claimed is:
1. A method of brightness-dependent control of a lamp arranged for illuminating a liquid crystal display comprising: automatically changing the operating voltage (UB) for the lamp in dependence on the measured brightness of the incident ambient light to increase and decrease the brightness of the lamp, respectively, according to an increase and decrease in the measured brightness of the incident ambient light, and reducing the operating voltage for the lamp in dependence on an increase in the measured ambient temperature and increasing the operating voltage for the lamp in dependence on a decrease in the measured ambient temperature.

2. A method as claimed in claim 1, characterized by changing the operating voltage (UB) by means of pulse-width modulation.

3. A method as claimed in claim 1, characterized by changing the operating voltage (UB) by means of pulse amplitude modulation.

4. A method of brightness-dependent and temperature-dependent control of a lamp for illuminating a liquid crystal display comprising: changing the operating voltage for the lamp in dependence on the measured brightness of incident ambient light thereby to increase and decrease the brightness of the lamp with an increase and decrease in the measured brightness of the incident ambient light, respectively, changing the operating voltage for the lamp in dependence on the measured ambient temperature by increasing and decreasing the voltage, respectively, according to decreasing and increasing measured ambient temperature, and switching off the lamp operating voltage when a presettable threshold value of the temperature is exceeded.

5. A circuit for brightness-dependent control of a lamp arranged to illuminate a liquid crystal display comprising: a pair of terminals for connection to a source of DC operating voltage for the lamp, a controlled semiconductor switching device, means connecting the switching device and the lamp in series circuit across said pair of terminals, a pulse generator supplying switching pulses to a control electrode of the switching device, and means for changing the pulse duration of the switching pulses produced by the pulse generator in response to the measured brightness of incident ambient light thereby to change the operating voltage for the lamp by increasing and decreasing the lamp operating voltage with an increase and decrease in the measured brightness of incident ambient light, respectively.

6. A circuit arrangement for brightness-dependent control of a lamp arranged to illuminate a liquid crystal display comprising: a pulse generator, means for measuring brightness of ambient light, means for changing the pulse height of control pulses produced by the pulse generator in dependence on the brightness measured, and wherein resistance of a controllable resistor connected in a current loop of the lamp is changed by means of current pulses thus produced.

7. A circuit arrangement as claimed in claim 6, further comprising: a voltage divider connected to a source of operating voltage and comprising a PTC resistor and a resistor, a first comparator which receives the control pulses and compares the pulse height to a decreasing voltage at a tap on said voltage divider, and means connecting the first comparator to a base of a switching transistor connected in series with the lamp across the operating voltage source.

8. A circuit arrangement as claimed in claim 15, further comprising a second comparator for shaping the control pulses, and means for coupling the second comparator between the pulse generator and an input of the first comparator.

9. A circuit arrangement as claimed in claim 8, further comprising a sawtooth generator which produces pulses that are applied to a third comparator having an output connected to an input of the second comparator.

10. A circuit arrangement as claimed in claim 9, wherein the sawtooth generator includes a fourth comparator comprising two RC networks.

11. A circuit arrangement as claimed in claim 9, further comprising a second voltage divider connected to said operating voltage source and including a capacitor and a phototransistor, and means connecting the output of the third comparator to a tap on the second voltage divider.

12. A circuit arrangement for brightness-dependent control of a lamp arranged to illuminate a liquid crystal display comprising: a pulse generator, means for changing the pulse duration of control pulses produced by the pulse generator in dependence on the brightness, a switching transistor connected in a circuit loop of the lamp, means for applying the control pulses to a first comparator which compares the pulse height to a decreasing voltage at a tap on a voltage divider, said voltage divider being connected to an operating voltage source and including a PTC resistor and a resistor, means connecting the first comparator to a control electrode of the switching transistor, and means connecting the switching transistor and lamp to terminals of a source of operating voltage so that the switching transistor controls current pulses through the lamp in response to said control pulses.

13. A circuit arrangement as claimed in claim 12, further comprising a second comparator for shaping the control pulses, and means for coupling the second comparator between the pulse generator and first comparator.

14. A circuit arrangement as claimed in claim 13, wherein said pulse generator includes a sawtooth generator and pulses produced by means of the sawtooth generator are applied to a third comparator connected between the sawtooth generator and second comparator.

15. A circuit arrangement as claimed in claim 14, characterized in that the sawtooth generator includes a fourth comparator comprising two RC-networks.

16. A circuit arrangement as claimed in claim 15, characterized in that operational amplifiers are used as comparators and are comprised of the same elements.

17. A circuit arrangement as claimed in claim 16, characterized in that an output of a third operational amplifier is connected to a tap of a voltage divider connected to the operating voltage source and comprising a capacitor and a photo-transistor.

18. A circuit arrangement as claimed in claim 17, further comprising a resistor connected in parallel with a main current path of the photo-transistor.

19. A method of controlling the operation of an electrically powered lamp illuminating a liquid crystal display in response to ambient brightness and temperature by automatically increasing and decreasing the power supplied to the lamp so as to increase and decrease the brightness thereof as a function of an increase and decrease, respectively, in measured brightness of incident ambient light and by switching off the power supplied to the lamp when the measured ambient temperature rises above a predetermined value.

* * * * *